United States Patent [19]

Otsu et al.

[11] Patent Number: 5,442,716
[45] Date of Patent: Aug. 15, 1995

[54] METHOD AND APPARATUS FOR ADAPTIVE LEARNING TYPE GENERAL PURPOSE IMAGE MEASUREMENT AND RECOGNITION

[75] Inventors: Nobuyuki Otsu; Takio Kurita, both of Tsukuba; Shigesumi Kuwashima, Tokyo, all of Japan

[73] Assignees: Agency of Industrial Science and Technology; Kabushiki Kaisha Ouyo Keisoku Kenkyusho, both of Tokyo, Japan

[21] Appl. No.: 80,976

[22] Filed: Jun. 24, 1993

Related U.S. Application Data

[63] Continuation of Ser. No. 778,741, Oct. 18, 1991, abandoned, which is a continuation of Ser. No. 414,530, Sep. 29, 1989, abandoned.

[30] Foreign Application Priority Data

Oct. 11, 1988 [JP] Japan .............................. 63-255678
Oct. 11, 1988 [JP] Japan .............................. 63-255679

[51] Int. Cl.⁶ .......................... G06K 9/62; G06K 9/46
[52] U.S. Cl. ....................................... 382/181; 382/190
[58] Field of Search ................... 382/15, 14, 16, 18, 382/27, 36–39

[56] References Cited

U.S. PATENT DOCUMENTS

| | | | |
|---|---|---|---|
| 3,267,431 | 8/1966 | Greenberg et al. | 382/14 |
| 3,588,823 | 6/1971 | Chow | 382/15 |
| 3,968,475 | 7/1976 | McMahon | 382/18 |
| 4,288,779 | 9/1981 | Otsu et al. | 382/18 |
| 4,760,604 | 7/1988 | Cooper et al. | 382/15 |
| 4,805,225 | 2/1989 | Clark | 382/15 |
| 4,954,963 | 9/1990 | Penz et al. | 382/15 |
| 4,965,725 | 10/1990 | Rutenberg | 382/15 |
| 5,048,100 | 9/1991 | Kuperstein | 382/15 |

OTHER PUBLICATIONS

Lippman "Intro to Computing with Neural Nets", IEEE ASSP Apr. 1987 pp. 4–22.
Pattern Recognition, vol. 16, No. 6, 1983, "A Method for the Design of Binary Tree Classifier", S. Qing-Yun et al., pp. 593–603.
S. Hinds, "Organization Based on Pattern Learning and Recognition", Proc. of the 1987 IEEE Conference on Systems, Man, and Cybernetics, pp. 724–729.
A. Khotanzad et al., "Distortion Invariant Character Recognition by a Multi-Layer Perceptron and Back–Propagation Learning", IEEE Intern. Conf. of Neural Networks, pp. 625–632.
"A New Scheme for Practical Flexible and Intelligent Visions Systems"; Nobuyuki Otsu and Takio Kurita; IAPR Workshop on CV; Oct. 12–14, 1988, Tokyo; pp. 431–435.

*Primary Examiner*—Michael T. Razavi
*Assistant Examiner*—David Fox
*Attorney, Agent, or Firm*—Wenderoth, Lind & Ponack

[57] ABSTRACT

An adaptive learning type general purpose image measurement and recognition method includes the steps of extracting a large number of basic initial features having values which are invariant to parallel displacement of an object to be caught in an image frame and which have additivity with respect to the image frame, and performing statistical feature extraction having a learning function on the basis of a multivariate analysis method applied to the extracted initial features to thereby adaptively enable use for various types of measurement. Further, An adaptive learning type general purpose image measurement and recognition apparatus includes a pick-up device for picking up objects of measurement in two dimensions, an image cutting-out device for partially cutting out video signals of the picked-up images, a correlating device for computing Nth order autocorrelation of the cut-out data, a memory device for storing coefficients of the autocorrelation, and an arithmetic controlling device respetive devices and for carrying out multivariate analysis based on the computed values to thereby adaptively enable use for various types of measurement.

4 Claims, 14 Drawing Sheets

METHOD AND APPARATUS FOR ADAPTIVE LEARNING TYPE GENERAL PURPOSE IMAGE MEASUREMENT AND RECOGNITION

This application is a Continuation of now abandoned application, Ser. No. 07/778,741, filed Oct. 18, 1991, which in turn is a Continuation of abandoned application Ser. No. 07/414,530, filed Sep. 29, 1989.

BACKGROUND OF THE INVENTION

1. Field of the Invention

This invention relates to a method and apparatus for various image measurements (including counting and discrimination) of the shapes and numbers of objects expressed in binary images in the field of image measurement, such as inspection or identification of parts on production lines, material or medical fields, and more particularly to a general or universal purpose image measurement and recognition device and method which either counts or measures geometric characteristics (such as a number or length of a circumference) of objects as the two-dimensional patterns at a high speed or discriminates two-dimensional patterns at a high speed by learning.

Further, according to this invention, the method is largely used as the general purpose image measurement and recognition device in which adaptive learning function and high speed of real time are requested.

2. Description of the Prior Art

In the prior art, an image measurement device is realized by sequentially and serially combining image processing techniques which are judged necessary in order to achieve particular tasks as shown in FIG. 1 (Sequential and Procedural Method). For example, in order to count the number of two types of particles in a binary image including a large number of particles of two different radii, all the particles (black circles) on a screen (white background) are first detected, and discriminated by attaching labels (numbers) to the respective particles. Next, their diameters, areas and so on are respectively measured, the type of the groups to which each particle belongs is decided, and the decision numbers are counted to finally obtain the respective numbers of particles of two different groups.

Since the above prior art devices are realized by combining various and complicated image processing techniques sequentially, the processing takes a long time for the calculation, and the entire system inevitably becomes large and complicated, posing a problem in high speed processing. The most critical problem inherent to these devices is that the duration of time necessary for the processing increases in proportion to the degree of complexity (e.g. the number of the particles in the above example) of the objective images. Another problem exits in that since these series of processings are those each prepared to achieve a specific and predetermined purpose, the device is dedicated solely to the predetermined purposes, and techniques should be modified for different uses. Moreover, these devices can be applied only to problems which are clearly known what is to be measured by which technique in what procedure.

Besides the above mentioned serial measurement method, there is proposed a parallel and adaptive method such as the models of "perceptron" or "neural networks" in pattern recognition. FIG. 2 shows the structure of such the neural networks which is modelled after the information processing of the brain. In the figure, layers (input layer, intermediate layer and output layer) having a large number of elements modelled after characteristics of neurons are connected in multilayers, and their connection coefficients are set as variable weights (parameters). In order to output desirable results (measured results) for the inputs, a large number of data for the learning operation are sequentially inputted, and the above connection coefficients are sequentially modified every time an error is made in output.

However, the above-mentioned measuring method is slow in convergence speed of the learning operation although it is fast in measuring processing because of the parallel processing. Further, local optimal solutions sometimes make obtaining the global optimal result difficult. Although the measuring method is adaptive and universal, the practical application inevitably takes a trial-and-error manner because it is not known what number of elements should be combined in what way to a particular problem or what should be inputted. The elements used in such the neural networks are restricted to use the input and output signals in the two values of "0" and "1" or the values therebetween on the model of neuron cells. Therefore, the weighted sum 10 of a large number of inputs is non-linearly transformed 11 before becoming one output as shown in FIG. 3. Although the expression of information in this type of measuring method is significant as a model of a neurological information processing, it is not quite important in practice and is rather limitative and inefficient. Therefore, the measuring method has some problems and limitations as a practical image measuring device.

U.S. Pat. No. 4,288,779, corresponding to Japanese Patent Publication (KOKOKU) No. 47064/1983, discloses a system which can discriminate two-dimensional patterns at a high speed and measure geometrical features of the patterns at a high speed. However, since the measuring method must have other machines do arithmetic operations necessary for the character recognition to have the results in advance, its usage is limited. It is limited in usages for reading out the characters because it solely aims at providing the features which do not need segmentation of a character, and it is not quite adaptive to the changes in the size and forms of the objective patterns. Therefore, the measuring method is not quite adaptive nor universal when a user wishes to apply it to a particular need at a particular shop. Since it is generally not easy to predict environmental conditions (disturbance, for example mistiness and image quality) and so on of the device in advance, it is impossible to prepare a method which is most adaptive and optimal to particular conditions.

SUMMARY OF THE INVENTION

This invention was conceived to eliminate such problems encountered in the prior art and aims at providing an adaptive learning type general purpose image measurement and recognition method and apparatus which extracts features in two stages of a relatively simple structure based on the observation of basic and principle conditions of the image measurement, and adaptively measures the images for arbitrary objects or usages suitable for various environments by a high speed learning operation.

According to one aspect of this invention, for achieving the objects described above, there is provided an adaptive learning type general purpose image measurement and recognition method which comprises the steps of extracting a large number of basic initial feature which are based on Nth order autocorrelation and invariant to parallel displacement of an object to be caught in an image frame and Which have additivity with respect to the image frame, and performing statistical features extraction having learning function on the basis of multivariate analysis methods applied on the extracted initial features to thereby enable use for various types of measurement adaptively.

According to another aspect of this invention, there is provided an adaptive learning type general purpose image measurement and recognition apparatus which comprises a pick-up means to pick-up objects of measurement in two-dimension, an image cutting-out means which partially cuts out video signals of said picked-up images, a window signal generating means which generates a window signal for designating a measurement scope, a correlating means which computes Nth order autocorrelation of said cut-out data within the scopes of said window signal, a memory means which stores coefficients of said autocorrelation, and an arithmetic controlling means which controls said respective as well as calculates multivariate analysis based on said computed values to thereby enable use for various types of measurement adaptively.

The nature, principle and utility of the invention will become more apparent from the following detailed description when read in conjunction with the accompanying drawings.

PREFERRED EMBODIMENT OF THE INVENTION

Most of the problems encountered in practical image measurement are those of measuring the area or circumference of an object caught within the frame (or on a screen) of images, and the counting of the number of voids or the counting of the number of objects of a large number of the same groups on the screen. Problems of recognition in determing an object are also included in the measurement (such as those of shape measurement) problems in a broader sense. The measured results to the problems of those measurements of various images are generally given in the form of measured values (numeral values), and therefore the image measurement can be regarded as a problem for extracting the features from an image. The fundamental conditions required for the features according to the present invention; are as follows.

① Invariant to parallel displacement
② Additivity with respect to a screen (an image frame)
③ Adaptive learning possibility The first condition ① means that no matter where an object exists within the frame, its measured value (for example, an area) is be the same and does not changed. The second condition ② means that when the screen is divided into plural sections, the sum of measured values in all the sections is equal to the measured value of the entire screen as is obvious from an example of counting the number of particles on the screen. The third condition ③ is important in order to obtain a device of the universal purpose, which is an object of this invention.

Feature extraction comprising the following two stages F1 and F2 is proposed in order to satisfy the above fundamental three conditions ① to ③.

F1: A large number of general and basic features which satisfy the above conditions ① and ② are extracted from the entire screen as initial features (Geometrical features extraction).

F2: New features which are optimized to various applications are adaptively extracted through the learning operation by means of linearly combining the above-mentioned initial features (Statistical feature extraction).

For the geometrical feature extraction of the stage F1, for instance, we can use the feature extraction by local autocorrelation masks based on the principle of autocorrelation of Nth order (refer to U.S. Pat. No. 4,288,779 corresponding to Japanese Patent Publication No. 47084/1983). The statistical feature extraction of the stage F2 can be realized by the techniques of in multivariate analysis such as multiple regression analysis. The linear combination in the statistical feature extraction F2 is necessary to maintain the above condition to realize the learning mode and the measuring recognition mode of the system.

Figure 1:
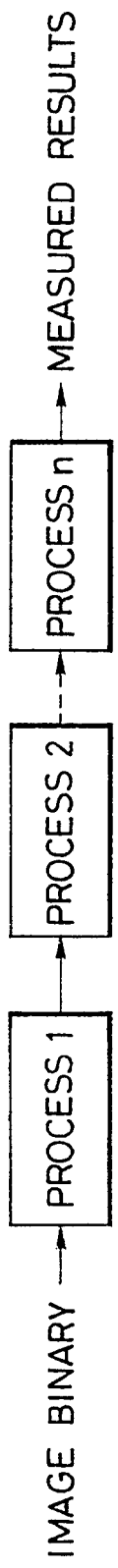
FIG. 1 is a conceptual block diagram to show the conventional serial measurement method.
Figure 2:
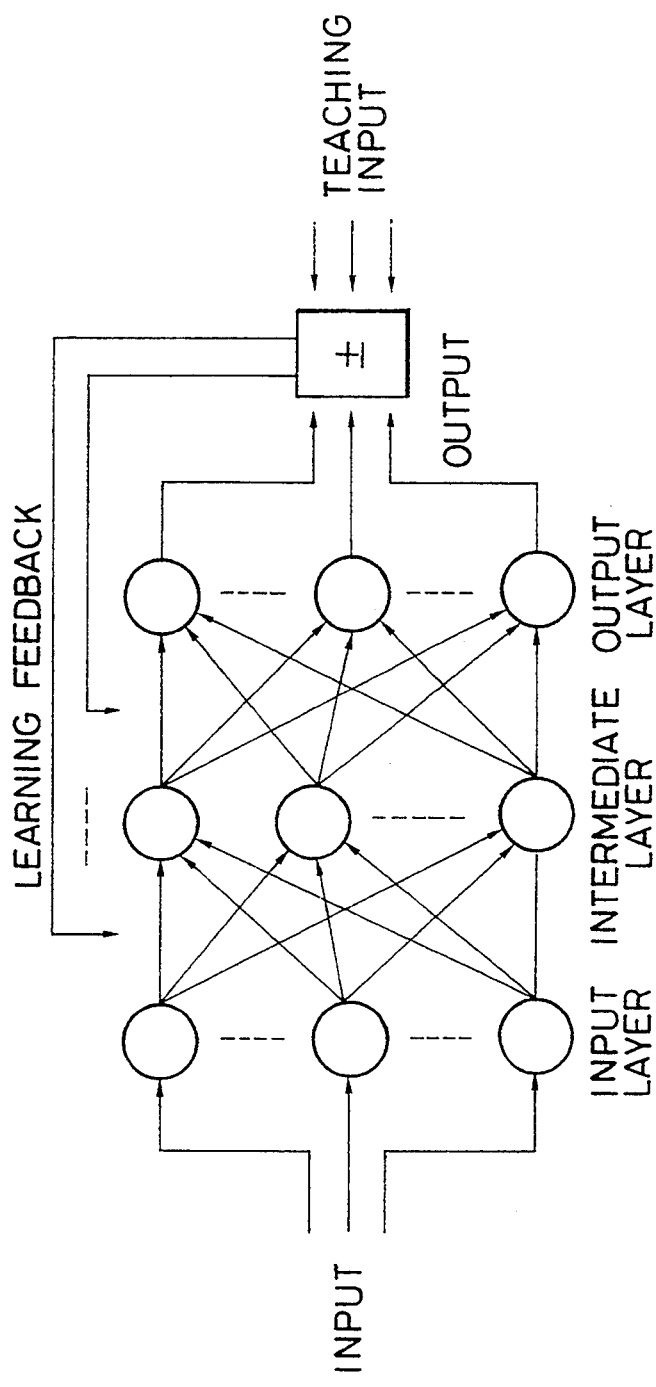
FIGS. 2 and 3 are charts to show a parallel and adaptive method and the element suggests by neuro-computing, respectively.
Figure 3:
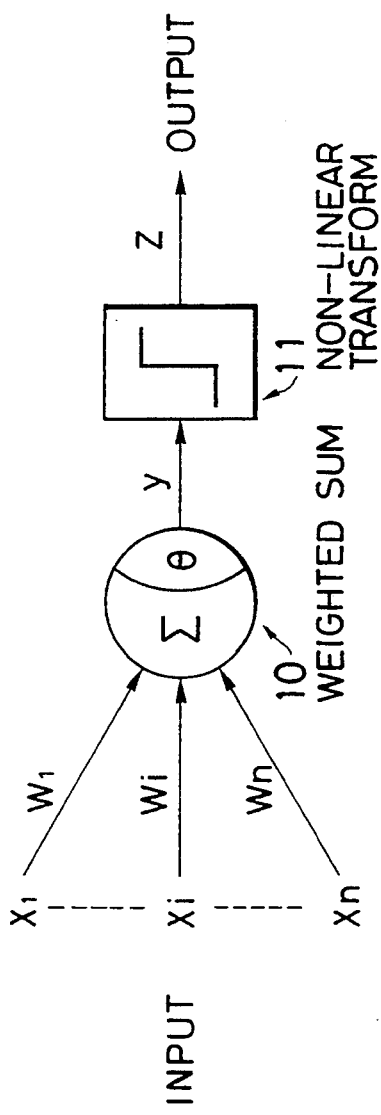
Figure 4:
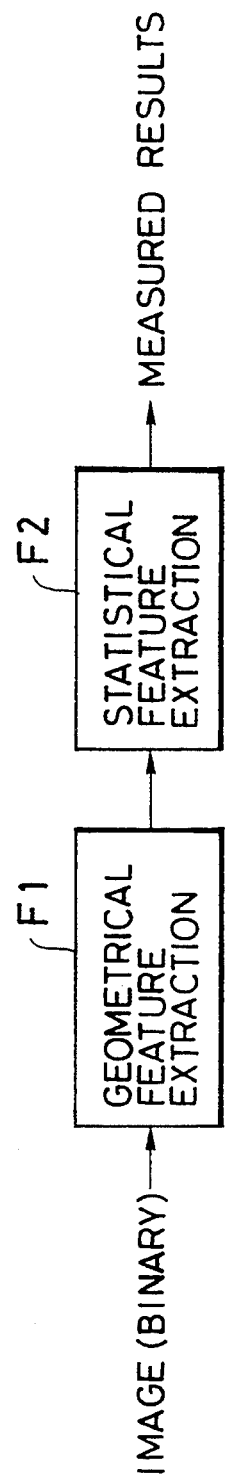
FIG. 4 ,is a conceptual block diagram to show the fundamental method of this invention measurement.
Figure 5:
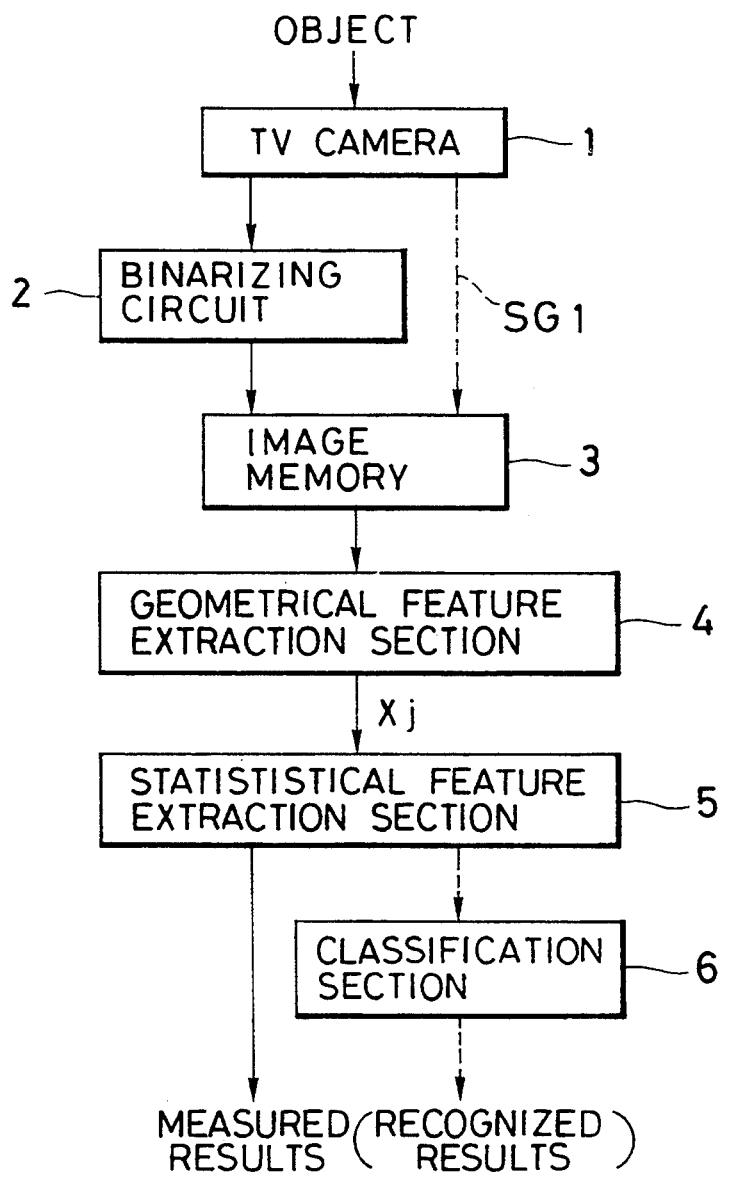
FIG. 5 is a flow chart to show the measurement and recognition principle according to this invention.

The measuring concept of this invention, as shown in FIG. 5, based on the feature extractions in the above two stages of F1 and F2, is a parallel and adaptive measuring method which can satisfy the fundamental conditions ① through ③, and is simple in structure and easy to implement. The measuring method enables the image measurement to be adaptive to various and many uses according to a high speed learning operation.

The measuring device according to this invention measures the images of the two-dimensional patterns universally and rapidly in real time based on the aforementioned operation.

The measuring principle of this invention will now be described referring to attached drawings.

An object of measurement as shown in FIG. 5 is expressed as a gray scale (multi-values) within a frame through a TV camera (for instance, CCD) 1. Although this measuring method is applicable to the gray scale (signal SG1) as [it is, it is applied here to binary images which are obtained by a binarizing circuit 2 for facilitating the explanation since the objects for the measurement are mostly binary images in practice. The gray scale is binarized by a predetermined threshold value and divided into object areas (value 1: black) and background areas (value 0: white), and are inputted into an image memory (M×M pixels) 3.

A geometrical feature extraction section 4 extracts the initial features for an image $f(\underline{r})$ (wherein $\underline{r}(i,j)$ is a two-dimensional vector representing its position on the screen) caught within the image frame (on the image memory 3; hereinafter referred to simply as on the screen). The features to be extracted are specifically the autocorrelation functions of Nth order shown below (refer to U.S. Pat. No. 4,288,779, the underlined reference letters hereinbelow represent vectors).

$$x(\underline{a}_1, \ldots, \underline{a}_N) = \sum_{\underline{r}} f(\underline{r}) f(\underline{r} + \underline{a}_1) \ldots f(\underline{r} + \underline{a}_N) \quad (1)$$

Figure 6:
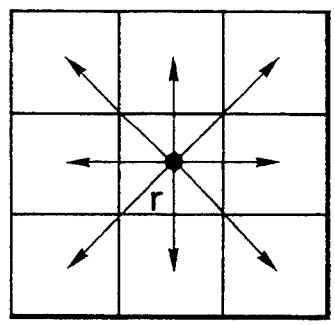
FIG. 6 is a chart to show the local displacement direction to compute Nth order autocorrelation.
Figure 8A:
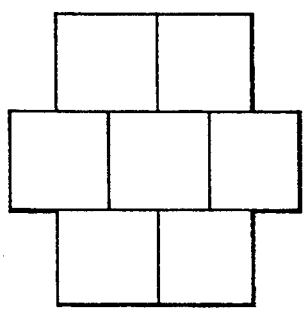
FIGS. 8A, 8B and FIG. 9 are views to show the local autocorrelation masks with hexagonal shapes up to the second order, respectively.
Figure 8B:
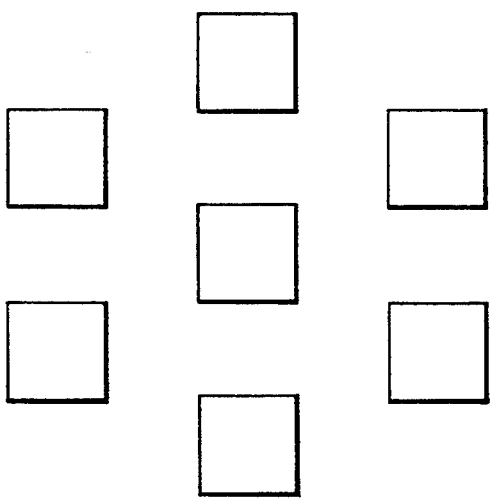
Figure 7:
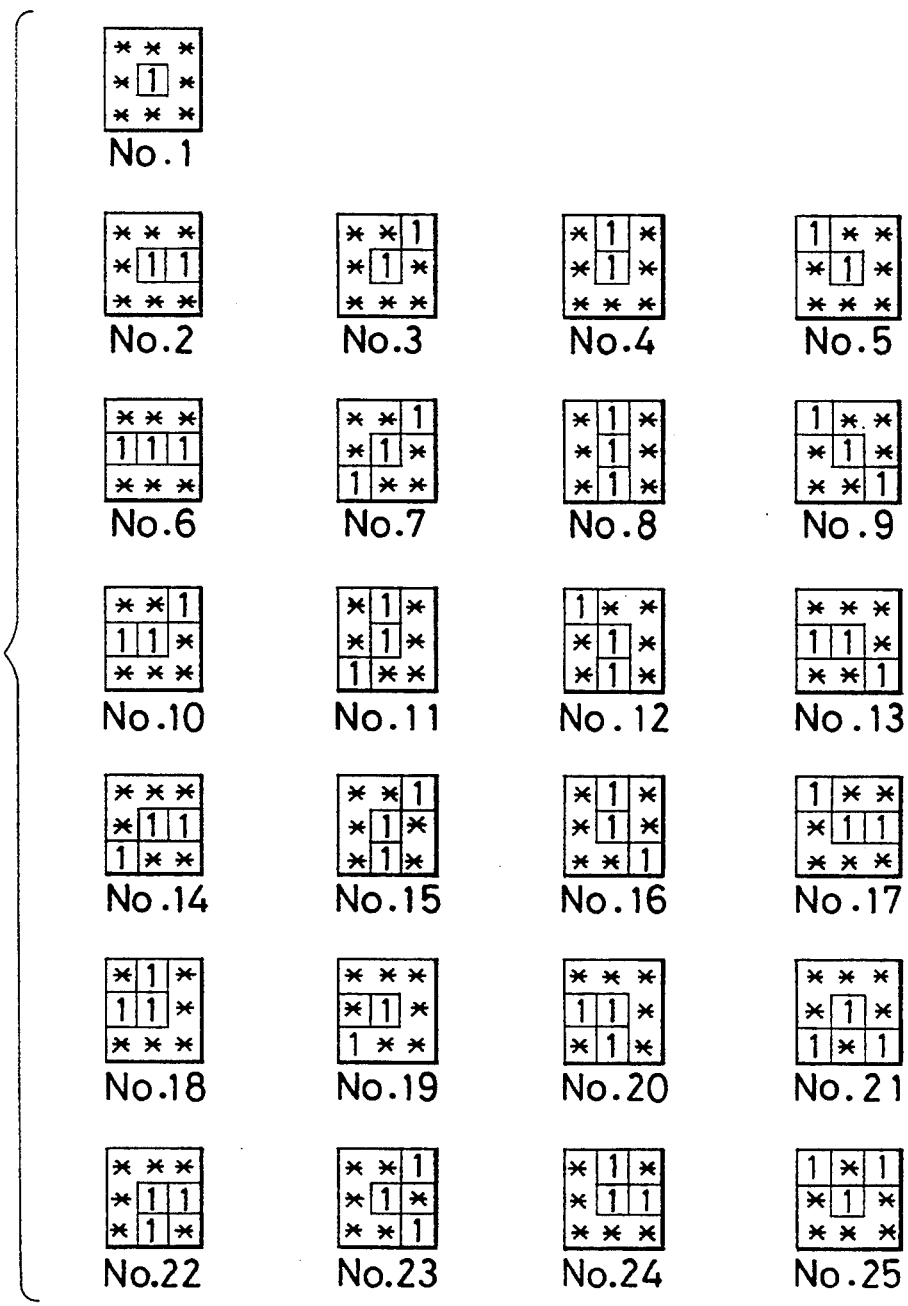
FIG. 7 is a view to show local autocorrelation masks up to the second order.
Figure 9:
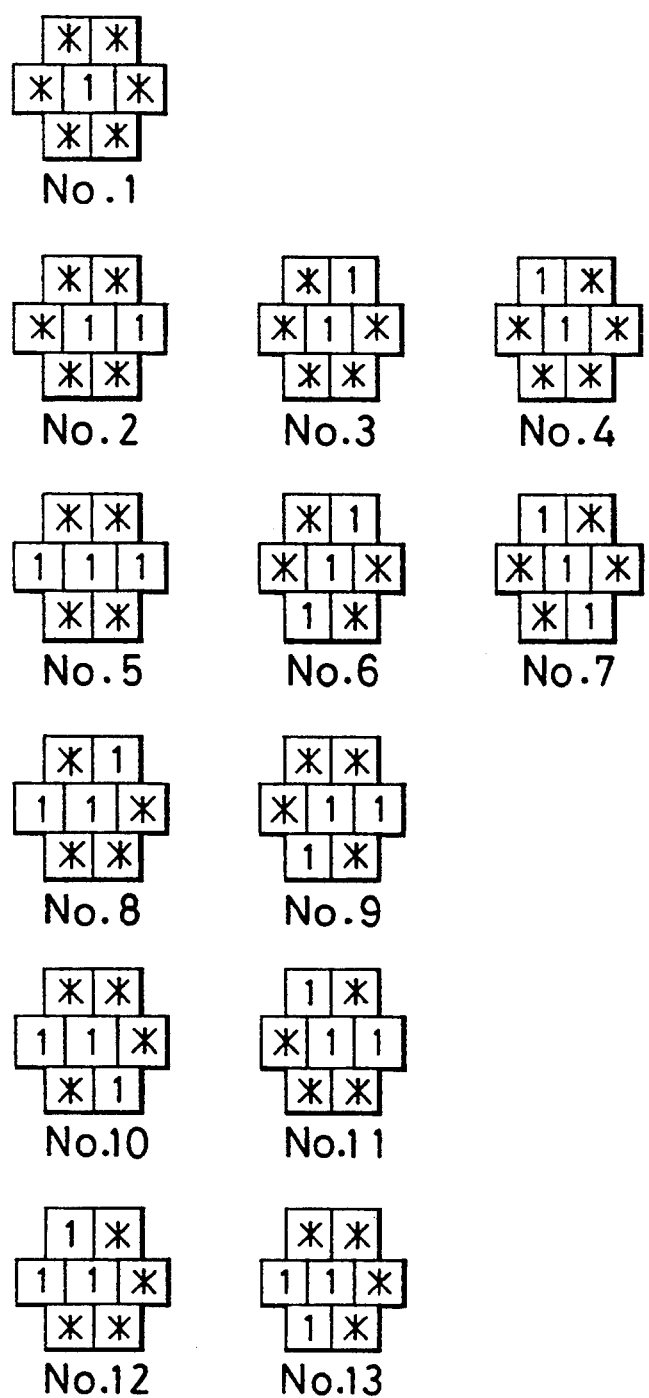
Figure 10:
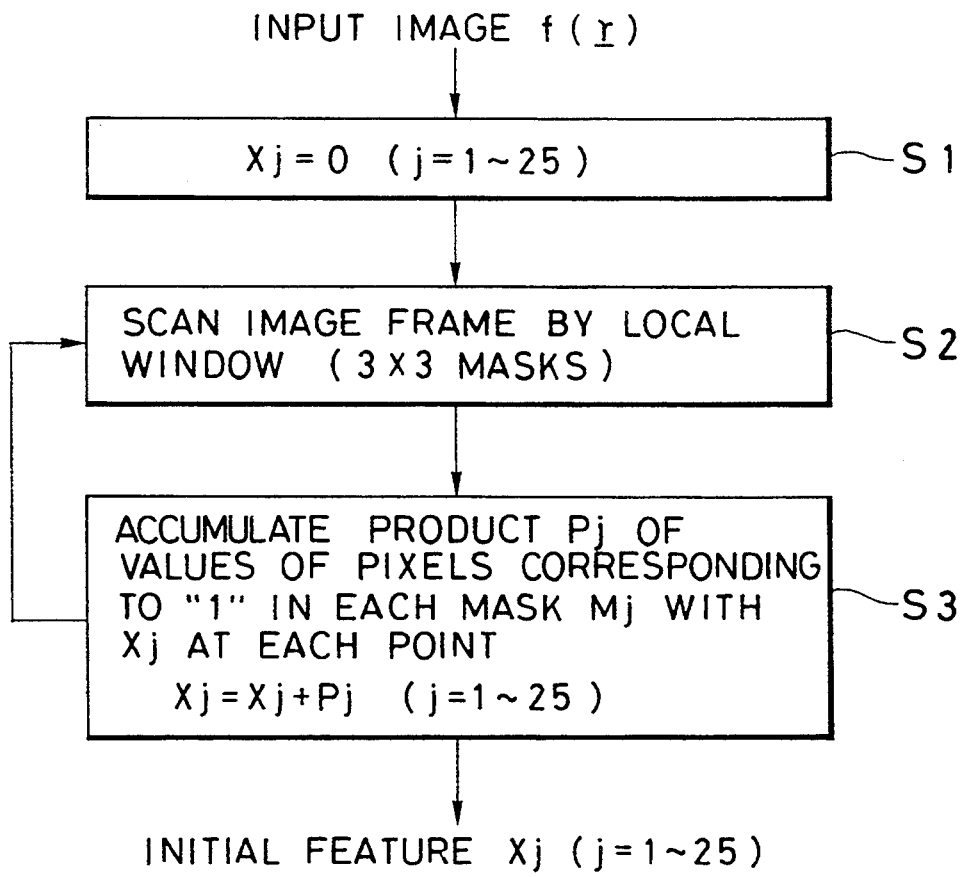
FIG. 10 is a flow chart to show an example of the operation for the basic initial feature extraction.

The extraction of the initial features is based on the principle of the above formula (1). In other words, the extraction of the initial features represents positional unchangeability or invariance with regard to any parallel displacement therein $f(\underline{r}) \rightarrow f(\underline{r}+\underline{b})$ within the image frame of the object. Although the displacement direction $(\underline{a}_1, \ldots, \underline{a}_N)$ may be arbitrarily determined, it would suffice for practical purposes if N is limited to the order of two and the displacement direction is limited to the directions of the locality 3×3 around a reference point $\underline{r}$ in order to satisfy the above condition (2). FIG. 6 shows an example of the local displacement direction. In this case, the Nth order autocorrelation function of the above formula (1) can be calculated by scanning once the entire screen with a local window (with the center $\underline{r}$) of 3×3. In the case of the binary images, this procedure means none other than the procedure of counting the number of times the expression holds as $f(\underline{r}) f(\underline{r}+a_1) \ldots f(\underline{r}+a_N)=1$ or the local patterns in an entire image where all the pixels (N+1) of the functions in the 3×3 local window become to "1". The such local patterns consisting of N+1 "1" pixel apparently exist in the number (in the case of up to the 2nd degree, N=0,1,2) of combination which allows N+1 pixel to be selected from the number 3×3=9. When we take the scanning into consideration, however, the patterns translatable in parallel displacement within the local window are equivalent to each other, and the number of independent patterns up to the 2nd order ultimately becomes "25" as shown in FIG. 7. In the patterns in FIG. 7, "1" represents pixels to be examined while "*" represents those to be ignored. These twenty-five patterns are called local autocorrelation masks. By scanning an entire screen once with these masks $M_j$ (j=1 through 25) and obtaining respective sums of matches, twenty-five local autocorrelation coefficients $X_j$ are obtained as the initial features. The procedure of calculation is shown in the Steps through 53 in FIG. 10. U.S. Pat. No. 4,288,779 corresponding to Japanese Patent Publication No. 47064/1983 discloses the details of the calculating circuit method. Mask patterns are not limited to the same shown in FIG. 6, and they may be hexagonal as shown in FIG. 8A or 8B instead of the square of size 3×3 as shown in FIG. 7. The correlation using such a hexagonal pattern is effective in that fluctuation of intervals between the pixels from the center pixel is smaller than those with a square pattern, in that the number of the independent patterns can be reduced to "13" due to the invariance of parallel displacement, and in that efficiency is higher compared to the case shown in FIG. 7. In practical construction, the phases of the clock signal may be deviated by 180 degrees for each scanning line. FIG. 9 shows a case of the autocorrelation mask (No.1 through No.17) which is independent in terms of the invariance of parallel displacement in the hexagonal patterns. The "1" and "*" within the patterns are similar to those shown in FIG. 7.

The initial features $X_j$ from the geometrical feature extraction section 4 are inputted to the statistical feature extraction section 5 as shown in FIG. 5. A description will now be given as to the statistical feature extraction (F2).

Figure 11:
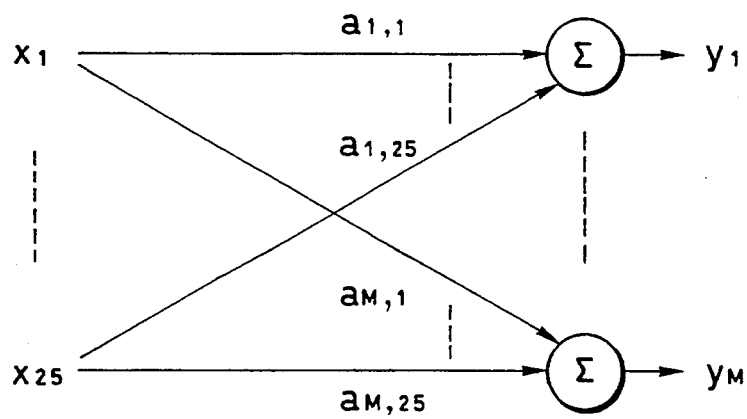
FIG. 11 is a chart to show a linear combination for the statistical feature extraction.

The initial features $X_j$ obtained as above are the features which are general and fundamental and which are not dependent on measurement problems. However, they cover the information of an objective image necessary for a measurement problem. Therefore, from these linear combinations, in the structure as shown in FIG. 11, and in accordance with the following formula (2), new features (measurement values themselves or forecast approximate values) effective to the measurement problem can be obtained as $y_i$.

$$y_i = \sum_{j=1}^{k} a_{ij} x_j (i = 1 \text{ to } M) \quad (2)$$

where K is equal to 25 in this case

The letter M represents the number of the feature values which are simultaneously measured. The above formula (2) can be simplified as the following formula (2') if the initial features $X_j$ and the new features are sorted in the vertical vector $\underline{x}=(X_1, \ldots, X_{25})'$ and $\underline{y}=(y_1, \ldots, y_n)'$ and a coefficient matrix $A=[a_{ij}]'$ is used (wherein "'" represents a transposition).

$$\underline{y} = A'\underline{x} \quad (2')$$

Figure 12:
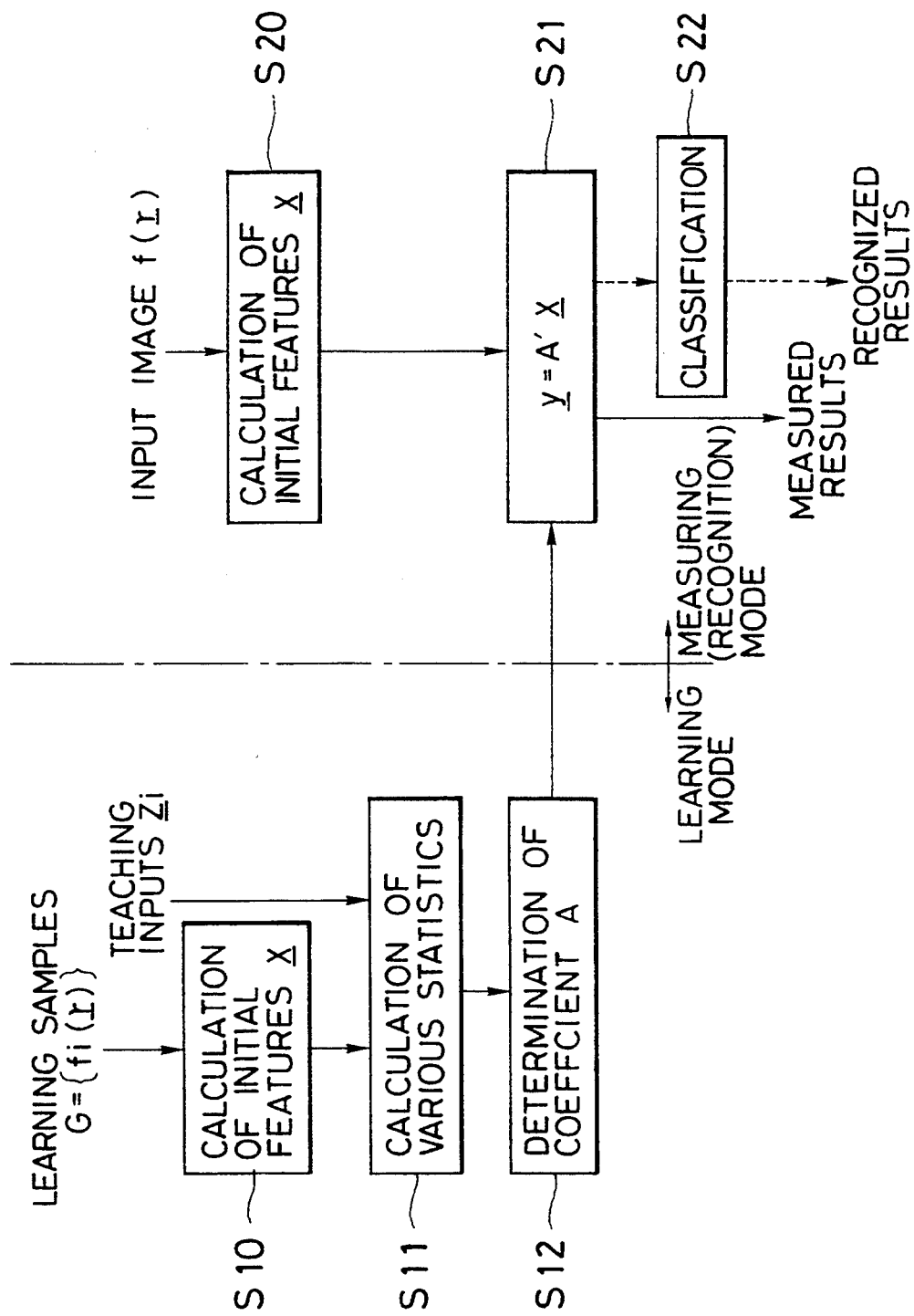
FIG. 12 is a flow chart to show the learning mode and the measuring recognition mode of the system.

The coefficient A may be obtained trivially depending on problems. For example, the coefficient A is apparently obtained as $y_1=X_1$ when the task is to count the area of a measuring object caught by the binary image, because the pixel number of the object is given by the autocorrelation coefficient $X_1$ with the mask $M_1$ the 0th order. By logical observation, other measuring values may be represented in a linear combination. However, these artificial methods are too complicated to be popularly used. This invention method therefore tries to obtain an optimal coefficient A automatically through the learning operation by means of a multivariate analysis method as shown in FIG. 12.

Multiple regression analysis, which is one of the multivariate analysis methods, is an effective and direct method especially suitable for the measurement problems. It is assumed herein that a set of objective images to be used in the learning operation is denoted as $G=\{f_i(\underline{r})\}$ (provided i=1 through L,) , a correct measurement vector for the image $f_1$ as $\underline{z}_i$, and the initial feature vector calculated at the Step S10 as $\underline{X}_i$ (therefore the output is $\underline{y}_i = A'\underline{X}_i$). The optimal coefficient A is obtained so as to minimize the following means square error (3) at the Step S12, and the optimal solution is explicitly given by the formula (4).

$$\epsilon^2(A) = \frac{1}{L} \sum_{i=1}^{L} \|\underline{y}_i - \underline{z}_i\|^2 = \frac{1}{L} \sum_{i=1}^{L} \|A'\underline{x}_i - \underline{z}_i\|^2 \quad (3)$$

$$A = R_{xx}^{-1} R_{xz} \quad (4)$$

The following formula (5) represents an autocorrelation matrix with respect to the initial features $\underline{X}_i$ and a cross-correlation matrix with respect to the input data $\underline{X}_i$ and $\underline{Z}_i$, respectively. To the power of "−1" herein represents an inverse matrix.

$$R_{xx} = \frac{1}{L} \sum_{i=1}^{L} (\underline{x}_i \underline{x}_i'), \quad R_{xz} = \frac{1}{L} \sum_{i=1}^{L} (\underline{x} \underline{z}_i') \quad (5)$$

The system in FIG. 5 can hereafter estimate quite accurately the measurement vector for an input image f ($\underline{r}$) in the running mode (Right half of FIG. 12) by using the coefficient A obtained at the Steps S11 and S12 in the learning mode (Left half of FIG. 12). If the accurate measurement vector $\underline{Z}_i$ can be expressed by the above formula (2), a correct coefficient A is automatically obtained by the learning operative.

Recognition of objects may be possible in a similar manner. In the case of the multiple regression analysis, it can be solved by considering the measurement vectors ($\underline{z}_i$ and $\underline{y}$) as codes differentiating the classes of the objects to be recognized, and doing the similar learning operation. For instance, when the objects comprises two classes, the coefficient A is learned in the learning mode for the class "1" as $\underline{z}=(1, 0)'$ and for the class "2" as $\underline{z}=(0, 1)'$. In the measuring (recognition) mode, a classification section 6 in FIG. 5 compares the feature $y_1$ with another feature $y_2$ for $\underline{y}=(y_1,y_2)'$ obtained for an input objective image (Step S22), and if $y_1$ is greater than $y_2$, it judges that it is class "1", and if it is smaller, it judges that it is class "2". If the classes are in a large number (K), similar operation can classify them. Accordingly, in the mode of the recognition mode, a processing for the classification such as detection of the maximum value of the feature $Y_i$ becomes necessary.

Discriminant analysis may be used as the learning operation of the coefficient A for recognition. In this case, the coefficient A can be obtained as a solution (eigenvectors) of an eigenvalue problem below in a manner to optimally separate (discriminate) K classes in the space of the vector $\underline{y}$.

$$X_B A = X_w A \Lambda (A' X_w A = I) \quad (6)$$

wherein the letter $\Lambda$ denotes the diagonal eigenvalue matrix, and I denotes the unit matrix. Further, the letters $X_w$ and $X_B$ denote respectively the within-class covariance matrix and the between-class covariant matrix of the initial feature vector $\underline{x}$, and are defined by the following formula.

$$X_w = \sum_{j=1}^{k} \omega_j \underline{\underline{X}}_j, \quad (7)$$

$$X_B = \sum_{j=1}^{k} \omega_j (\underline{\bar{X}}_j - \underline{\bar{X}}_T)(\underline{\bar{X}}_j - \underline{\bar{X}}_T),$$

wherein $\omega_j$ and $\underline{\bar{X}}_j$ and $X_j$ represents respectively the occurrence probability, the mean vector and the covariance matrix of class "j", and $\underline{\bar{X}}_T$ the total mean vector. A classification method for the discriminant analysis may be a method which calculates the distance from an input ($\underline{y}$) to the mean vectors ($\underline{\bar{y}}_j = A'\underline{\bar{X}}_j$) of each class and determines the input into the class which gives the minimum distance.

Figure 13:
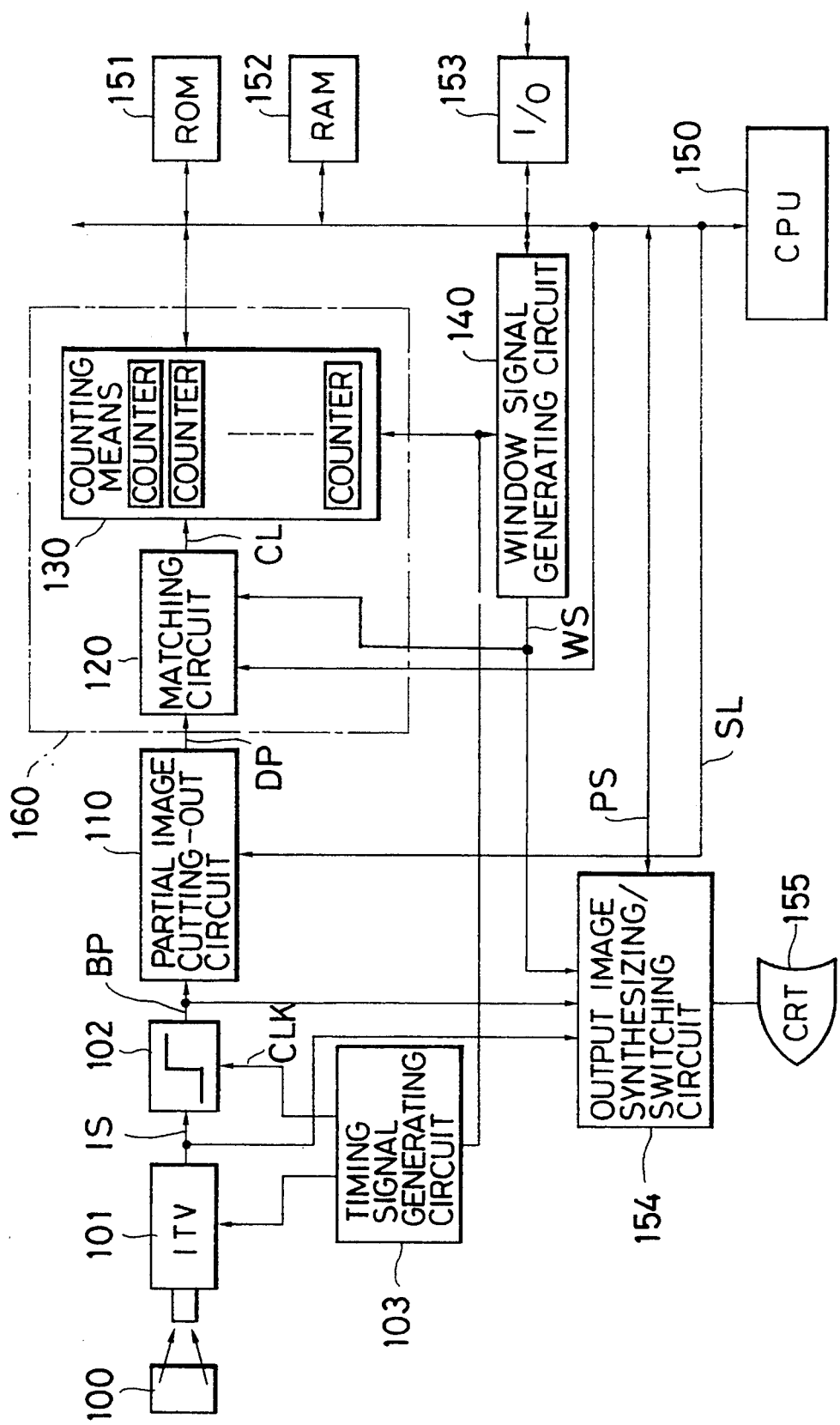
FIG. 13 is a block diagram to show an embodiment of this invention device.

The image measuring device according to this invention is based on the aforementioned principle, and an embodiment will now be described referred to FIG. 13.

Figures 14, 15, 16A, 16B:
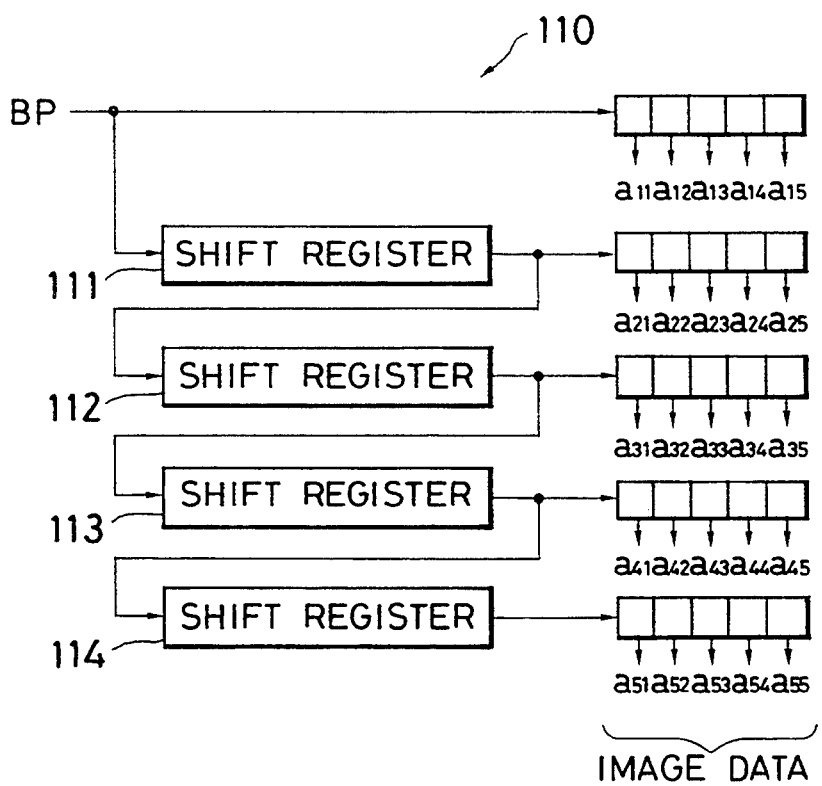
FIG. 14 is a detailed circuit to show partial image cutting-out circuit.
FIG. 15 and FIGS. 16A and 16B are views to show examples thereof in output, respectively.
Figure 17:
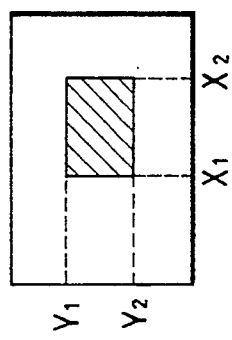
FIG. 17 is a block diagram to show the structure of an output section.

An industrial TV camera 101 picks up an objective image 100, and sequentially outputs two-dimensional video images IS in time series to a sampling circuit 102 and an output image synthesizing/switching circuit 154. The sampling circuit 102 converts the video images IS sequentially into digital values (herein binary values) BP in accordane with a clock signal CLK fed from a timing signal generating circuit 103. The clock signal CLK is of about 6 MHz if the entire screen is assumed to have 320-pixels horizontally and 240-pixels vertically. The binary images BP from the sampling circuit 102 are inputted to the output image synthesizing/switching circuit 154 and to a partial image cutting-out circuit 110 which is shown in more detail in FIG. 14. In the partial image cutting-out circuit 110, the serial binary images BP are converted into parallel image data $a_{11}$ through $a_{55}$ of $5\times 5=25$ pixels when they are inputted to shift registers 111 through 114 which delay images by one horizontal line. Nine pixels are selected from the parallel 1 image data $a_{11}$ through $a_{55}$. If it is assumed that pixels for outputs are $P_1$ through $P_9$ shown in FIG. 15 are as listed in Table 1, nine pixels in a square shape of $3\times 3$ size as shown in FIG. 16A or nine pixels in a square shape of $5\times 5$ size as shown in FIG. 16B will be outputted. The relationship between the mask patterns and the objective image may be modified size-wise in similar figures. The size may easily be increased to $7\times 7$ or $9\times 9$ simply by adding other circuits. By preparing plural sets of the mask patterns, parallel and simultaneous processing becomes possible. These functions enable the extraction of the features with an appropriately sized mask pattern adaptively to the size of the objective pattern but without the necessity of changing the magnification of the pick-up lens system.

TABLE 1

| input A | input B | output |
|---------|---------|--------|
| $a_{11}$ | $a_{22}$ | $P_1$ |
| $a_{13}$ | $a_{23}$ | $P_2$ |
| $a_{15}$ | $a_{24}$ | $P_3$ |
| $a_{31}$ | $a_{32}$ | $P_4$ |
| $a_{33}$ | $a_{33}$ | $P_5$ |
| $a_{35}$ | $a_{34}$ | $P_6$ |
| $a_{51}$ | $a_{42}$ | $P_7$ |
| $a_{53}$ | $a_{43}$ | $P_8$ |
| $a_{55}$ | $a_{44}$ | $P_9$ |

The pixels may be selected with a selection signal SL from a controlling section comprising a CPU 150 and so on by, for instance, a multiplexer 115 as shown in FIG.

17. For example, either one of the pixels $a_{11}$ and $a_{22}$ is selected and then outputted.

Figure 19:
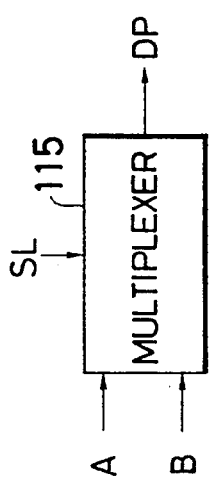
FIG. 19 is a view to explain the coordinates of a window.
Figure 18:
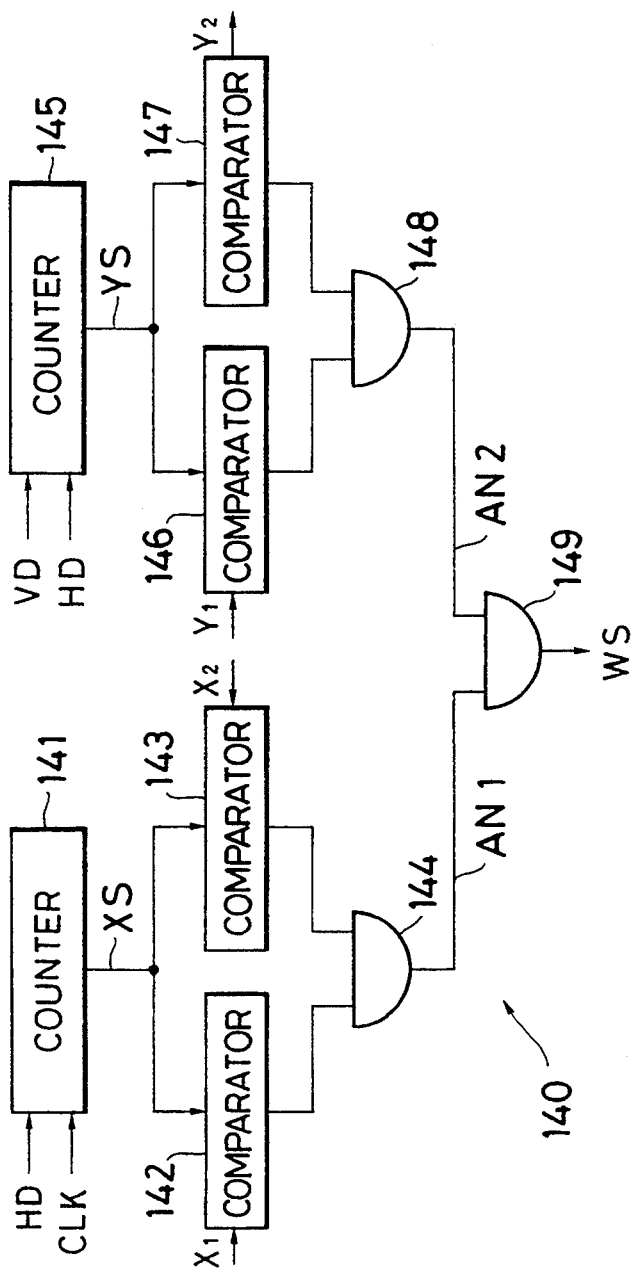
FIG. 18 is a circuit to show an embodiment of a window signal generating circuit.

The video images DP thus cut-out are inputted to a matching circuit 120 within a correlating circuit 160, and correlated to an autocorrelation mask since it is unchanged by the parallel displacement. The matching circuit 120 matches them within the scope of a window signal WS generated by a window signal generating circuit 140. A description will be first given as to the window signal generating circuit 140. The window signal generating circuit 140 is structured as shown in FIG. 18. For simplicity's sake, the explanation is made in respect of a case where a circuit is structured to process the hatched portion (or window) out of the video signals as shown in FIG. 19. The circuit inputs horizontal synchronizing signals HD, vertical synchronizing signals VD and the clock signal CLK from the timing signal generating circuit 103, and counters 141 and 145 generate X-coordinates XS and Y-coordinates YS. In other words, the counter 141 counts the clock signal CLK using the horizontal synchronizing signals HD as a clear signal while the counter 145 counts the horizontal synchronizing signals HD using the vertical synchronizing signals VD as a clear signal. The output XS from the counter 141 and the output YS froth the counter 145 are compared by digital comparators 142,143 and 146,147 respectively with the coordinates $X_1$, $X_2$ and $Y_1$, $Y_2$ shown in FIG. 19 set in the controlling section. Then, only when AND circuits 144,148 and 149 judge that $X_1 \leq$: X-coordinates $XS \leq X_2$ and $Y_1 \leq$ Y-coordinates $YS \leq Y_2$, the AND circuit 149 outputs the window signal WS. In other words, the window signal WS is outputted in a manner so that when the output XS from the counter 141 exists between the set values $X_1$ and $X_2$, the output AN1 from the AND circuit 144 becomes "1", when the output YS from the counter 145 exists between the set values $Y_1$ and $Y_2$, the output AN2 from the AND circuit 148 becomes "1", and when the both of the outputs AN1 and AN2 are "1", the output from the AND circuit 149 becomes "1". Therefore, when the output exists within the hatched portion shown in FIG. 19, the window signal WS becomes "1". The window signal WS is inputted to the matching circuit 120 to designate the scope of matching and the output image synthesizing/switching circuit 154. Correlation histogram is counted only when the window signal WS is "1" (or possibly "0". The end of tills window signal WS becomes a sign to finish the counting operation. The window signal WS is effective since it can process only the objects, cut out in accordance with the size of the object, and sequentially scan a screen at an arbitrary interval.

The matching circuit 120 conducts matching operation with the autocorrelation mask as shown in FIG. 7 by obtaining logical products of the portion of "1" in the figure. If the image is of multivalues, the sum of the portions of "1" will suffice.

The correlation data CL matched by the matching circuit 120 are inputted to the counting means 130 comprising plural counters in a number equivalent to the autocorrelation masks, and outputs thereof are then sequentially counted by the plural counters. The counted data are stored in an RAM 152 and may be read out at any time. Then, the data of the counting means 130 are initialized by the horizontal and vertical synchronizing signals from the timing signal generating circuit 103.

The output image synthesizing/switching circuit 154 switches the video images IS from the TV camera 101 and the binary images BP with the switching signal PS from the CPU 150 to display, and displays the window signal WS when the need arises. The CPU 150 makes the necessary setting at the sampling circuit 102, the partial image cutting-out circuit 110 and the counting means 130 in accordance with the program stored in the ROM 151, conducts the learning and the arithmetic operations, and does the measurement and output. The CPU 150 is connected with such input devices as a keyboard via an input/output interface 153 so that it car/input the teaching data, direct the learning sampling, output the results and input for directly various settings. For instance, the size (5×5 or 3×3) to be cut out of images is controlled in a way since the mask pattern No. 1 represents the area (size) of an object pattern, if this value is greater than a predetermined value, the size 5×5 will be chosen while if it is less than the value, the size 3×3 will be chosen.

In these constructions, the object 100 which has been picked up by the TV camera 101 is extracted of the features in the form of 25-dimensional vector or initial features $X_j$ as a matching histogram (counted values) with the mask patterns. Only the space within the window becomes the object of measurement, and the initial features $X_j$ are extracted every time the window signal WS ends. In the process of the learning operation, the initial features $x_j$ are stored in the RAM 152 together with the information reached in accordance with plural commands. In the process of the arithmetic analysis, the plural data within the memory are processed using the multivariate analysis technique so as to determine the parameters for the subsequent measurements. In the process of the measurement, with these parameters, the initial features $X_j$ extracted from an unknown object are judged to output the result of the measurement.

Concrete embodiments in which this invention method is applied to various uses will be explained hereinafter. The binary image is considered and an example in a case where multiple regression analysis is used as the statistical feature extraction by an adaptive learning is explained, and the case of discriminant analysis is omitted.

Figure 20A:
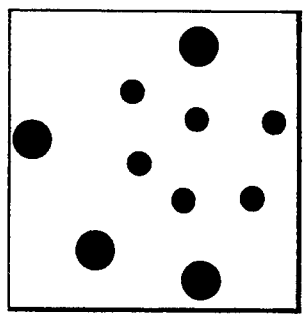
FIGS. 20A to 20D are image views in number measurement of two type particles.
Figure 20B:
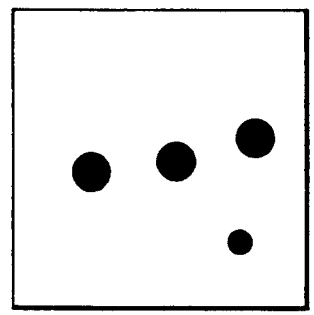
Figure 20C:
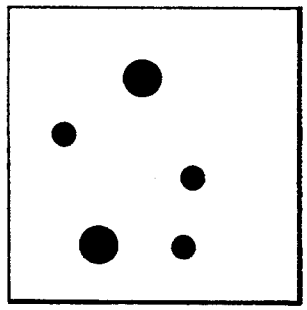
Figure 20D:
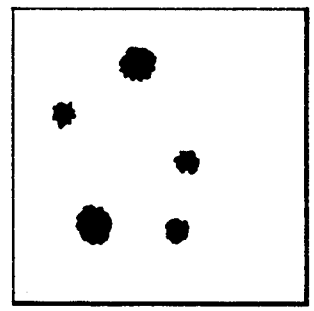

First, the result of applying the method to a problem to simultaneously measure the number of two circles (particles) in an image frame which have different diameters is explained. Fourty images including two type circles in random are prepared and the examples are shown in FIGS. 20A to 20D. The image in FIG. 20D shows a real binarized image which is inputted to a system through a TV camera for the image in FIG. 20C and the image in FIG. 20D is seen to be greatly influenced by noises. The learning operation is performed by using the above images. In this case, the teaching input to the respective images is a two-dimensional vector of $z = (z_1, z_2)'$, the letter $z_1$ is a number of larger circles and the letter $z_2$ is number of smaller circles. The most suitable coefficient matrix A (25×2) is obtained by the learning operation and the measurement (estimation) to the inputted image is performed by $\underline{y} = (y_1, y_2)'$ of the formula (2') using the coefficient matrix A. For example, the measurement to the image in FIG. 20A was ($y_1$, $y_2$): (4.10, 5.88), the image in FIG. 20B ($y_1$, $y_2$): (3.09, 0.88) and the image in FIG. 20C ($y_1$, $y_2$) = (1.97, 3.02). It is possible to obtain good results while the images are influenced by noises (Right number is obtained by rounding with a margin).

Figure 21A:
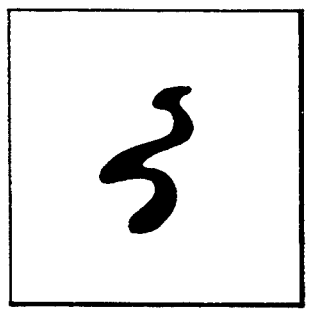
FIGS. 21A to 21D are image views in the measurement of topological characteristics.
Figure 21B:
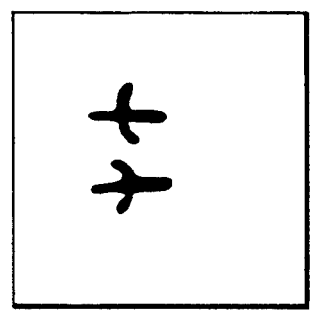
Figure 21C:
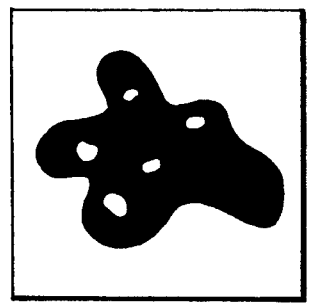
Figure 21D:
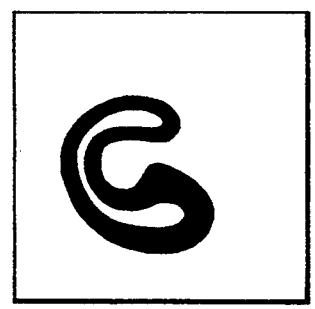

Next, measurement examples of topological characteristic of the objective image are shown in FIGS.21A to 21D. For example, the examples are numbers of the objects separated in the image frame (FIGS.21A and 21B) and are numbers of holes of the objects (FIGS.21C and 21D). It is an important matter as the topological characteristics that the number is irrespective of the shapes of the objects or the holes. For the forty-eight images including the various objects separated, the learning operation is performed as the teaching inputs $z_1$ of the right number. FIGS. 21A arid 21B are examples of the images which are used in the above examples. As a result, the system rightly measures the number of separated objects for the inputted images which are optionally given. The value $y_1$ was respectively "1, 2" for FIGS. 21A and 21B. The measurement of the void number also could obtain very good results. The value $y_1$ was respectively "5, 1" for FIGS. 21C and 21D.

The above measurement principle proves that Euler's formula in topology is substantially approximated with models. What is most significant herein is the system according to this invention method automatically learns the Euler's formula (instead of being taught as a program).

The application to the recognition operation is explained. The objects are generated "84" numbers in triangle of optional shape and are respectively allotted to the learning images. The recognition problem discriminates which is an acute or obtuse angle and the teaching inputs were $(Z_1, Z_2)=(0, 1)$ for the obtuse angle triangles and $(z_1, z_2)=(1, 0)$ for the acute angle triangles. When the 84-images are recognized by using the most suitable coefficient matrix A, only one was missed, the acute angle as the obtuse angle. The missed triangle was almost a rectangular triangle.

Figure 22:
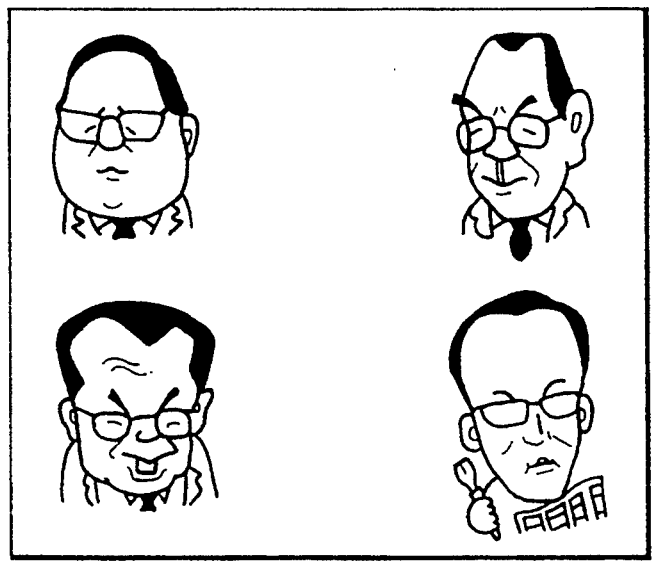
FIGS. 22 through 25 are views to explain application of this invention to pattern recognition.
Figure 23:
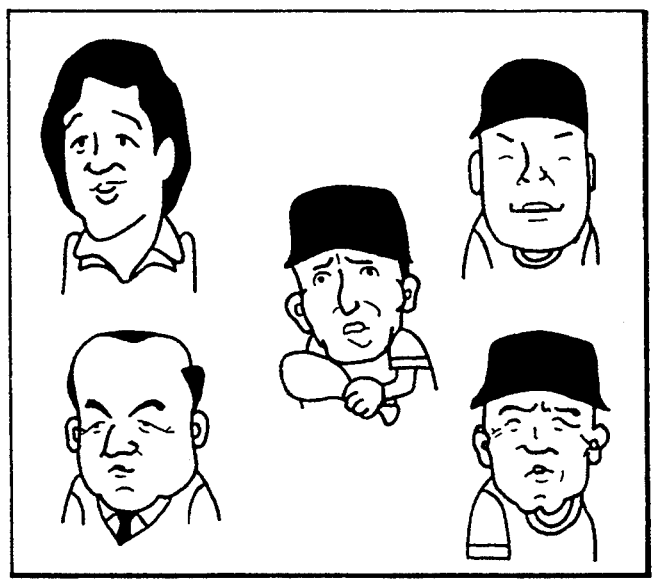
Figure 24:
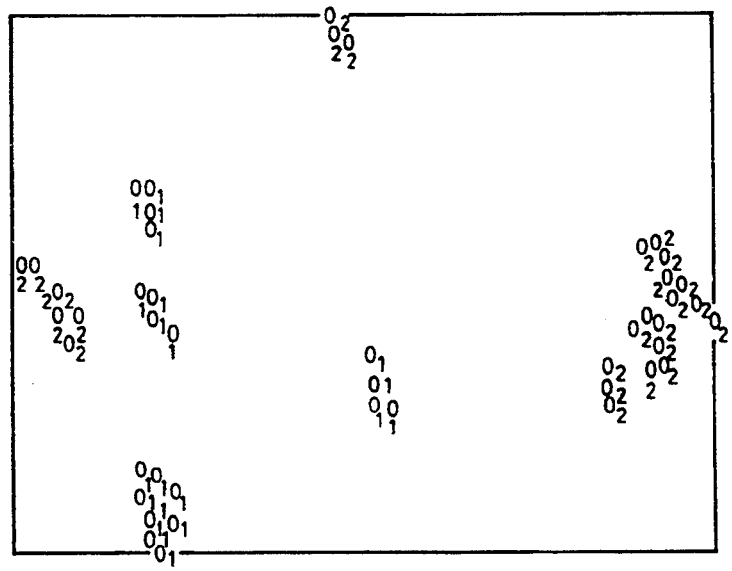
Figure 25:
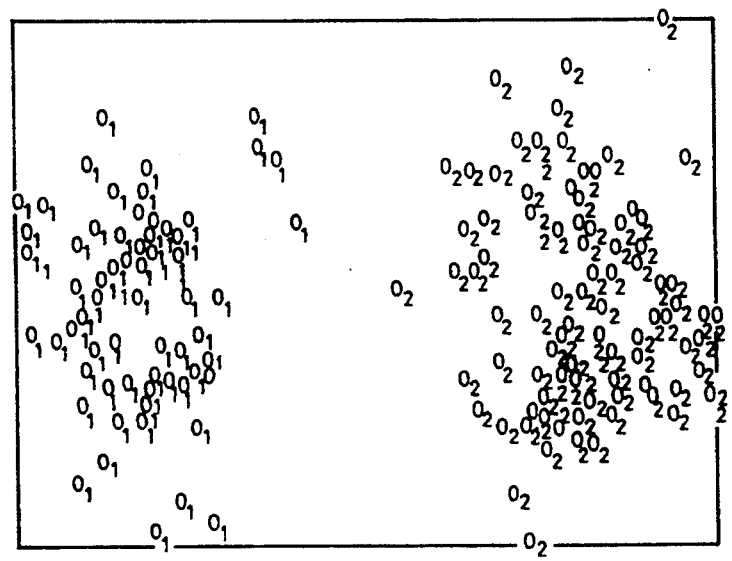

An example of practical application of the aforementioned image measuring device will now be described hereinbelow. The device may be applied to a system which discriminates faces wearing glasses as shown in FIG. 22 from faces without glasses as shown in FIG. 23. The system first shows the faces with glasses in FIG. 22, then sets windows to include one face in each, indicates classes (in other words whether or not the face wears a pair of glasses) and samples them. Sampling data comprises 25-dimensional vectors and classes (i.e. "1" or "2"). These faces are inputted in a manner to allow slight disturbance (e.g. giving a minute angular displacement for 10 times). Tile similar operation is conducted for the faces without glasses shown in FIG. 23. This makes the ninety initial features x stored in the RAM 152, and the learning process is ended. The CPU 150 does the discriminant analysis in its arithmetic operation to extract the statistical features which are optimal for determining the faces with glasses from the faces without glasses. While in FIG. 24 the data of the faces form lumps randomly with class 1 and class 2 mixed, in FIG. 25 (after the discriminant analysis) the two classes 1 and 2 are distinctively separate. The statistical features which can discriminate the faces with glasses from those without glasses are extracted, and may be applied to unknown faces. In FIG. 24, the first principal component is plotted on the horizontal axis and the second principal component on the vertical axis to show the result of the principal component analysis. In FIG. 25, the first eigen-projection is plotted on the horizontal axis, and the second eigen-projection on the vertical axis to show the result of the discriminant analysis. In the measurement (discrimination) process, unknown face data $\underline{x}$ are judged in the discriminant space by comparing $\underline{Y}=A\underline{x}$ with the mean vector of each class and classification rule of their classes (i.e. the faces with or without glasses). The result is indicated, for example, by outputting a text that this particular face wears glasses when the face is judged to belong to the class 1.

It is possible to measure images at very high speed and in real time by performing the most suitable statistical feature extraction adaptive to the respective measurement problems obtained by the learning from the common initial features obtained by the once scanning of the image frame without consideration of the cutting, while the conventional method cuts the objective region from the image frame and sequentially applies specific image processing and feature extraction. Moreover, an important matter is that the processing time is constant irrespective of the measurement problems. For example, in a case of particle measurement, the measurement time for "1000" particles is equal to the same for that of particle "1". Further, according to this invention, it is easy to realize the device since the structure is simple and essentially parallel calculation.

It is possible to apply the same device to various usages by the adaptive learning operation, and the device has high generality, and the learning operation, due to the multivariate analysis, is simple and carried out at a high speed. Especially, it does not require give an algorithm as to how to measure and it is sufficient to show an image to simply become examples and answers (measuring values to be obtained) for those. In this connection, it is possible to apply the invention to the problem which is impossible by the prior art sequential method and measurement algorithm is unknown. Further, since the position is invariable, it is possible to measure moving images (objects sequentially moving in time, for example, parts on the belt-conveyor). Therefore, the present method has good effects as an inexpensive general purpose image measuring device.

Further, the feature extraction according to tills invention has good effciency and universal character, and therefore it is possible to link to neuro-computers, especially multilayered feed-forward neural networks with an error back propagation learning operation. For example, in a case of inputting letters (images) of $32 \times 32$, it require input layers of 1024 if the input for pixels thereof is directly performed. On the contrary, the number of the inputs is 13 to 25 if the output of the local autocorrelation mask according to this invention is used. In this connection, the structure of the neuro-computer may be small. The efficiency becomes great if the object image is large. Further, since the system does not require position-invariant learning and can efficiently learn, the learning time becomes short. The neuro-computer is described in "Parallel Distributed Processing", Vol. I, II, MIT Press, 1986, by D. E. Rumelhart, J. L. Mcclellard and the PDP Research Group.

As described above, according to this invention measurement and recognition device, users of the device can learn the device about the objects they wish to measure, to thereby allow the device automatically to select the optimum measurement method under the particular situation and to measure the objects at a higher speed. Therefore, this invention device can be applied to any uses no matter how difficult it is to determine an optimal means for discrimination. Further, the device performs the measurement at high resistance against the disturbance at the site, since it can learn about surrounding environment. The device is not only adaptive, but is also easy to use since it can provide the extraction of the feature effectively and adaptively by such functions as windows and mask size switching. The device can perform a high speed processing in real time due to parallel calculation irrespective of the position of a particular object with a window. Since it is of the adaptive learning type, the same device can be applied to various purposes and thus is of universal use. The device does not have to be fed with any algorithm, but can measure if users simply provide example images and corresponding answers (or measurement values to obtain).

It should be understood that many modifications and adaptations of the invention will become apparent to those skilled in the art and it is intended to encompass such obvious modifications and changes in the scope of the claims appended hereto.

What is claimed is:

1. An adaptive learning type general purpose image measurement and recognition apparatus, said apparatus operative in a learning mode and a recognition mode, and comprising:

an image pick-up device which operates in the learning mode to view teaching objects to generate corresponding first image signals of the teaching objects located within a two-dimensional image frame, and which operates in the recognition mode to view unknown objects to generate second image signals of the unknown objects located within the two-dimensional image frame;

a window signal generating means for generating a window signal for designating a measurement scope for a pick-up image;

an image cutting-out means for partially cutting out a sub-image by using a local window for said measurement scope;

an extracting means for operating in said learning mode to extract and store in a memory basic initial features of said first image signals of said teaching objects, and for extracting and storing in said memory basic initial features of said second image signals of said unknown objects;

a matching means for matching said sub-image and autocorrelation computing mask within the measurement scope;

a counting means for counting data outputted from said matching means;

input means for inputting as teaching information a data pair denoting a number of the teaching objects and a type of the teaching objects;

a means for storing in said memory plural pairs of said basic initial features of said first image signals of said teaching objects and a corresponding teaching information;

a processing means for processing the plural pairs of basic initial features and the corresponding teaching information stored in said memory so as to extract statistical features of said basic initial features by combining the basic initial features to obtain coefficients which are optimally determined based on a multivariate analysis;

a means for storing said coefficients in said memory;

a means for applying said coefficients stored in said memory to said basic initial features of said second image signals of said unknown objects so as to generate as a recognition result at least one data pair denoting a number and a type of the unknown objects.

2. An adaptive learning type general purpose image measurement and recognition apparatus as claimed in claim 1, wherein said autocorrelation masks include plural sets of different sizes.

3. An adaptive learning type general purpose image measurement and recognition apparatus as claimed in claim 1, wherein said autocorrelation computing masks are hexagonal shaped.

4. An adaptive learning type general purpose image measurement and recognition apparatus as claimed in claim 1 wherein said extraction means includes means for extracting a plurality of basic initial features having values which are invariant to parallel displacement of an object to be caught in an image frame, and wherein said processing means includes means for feeding the basic initial features to the input layer of a multi-layer neural network having error back propagation learning to thereby adaptively be utilized for various image measurements.

* * * * *